United States Patent [19]

Rodgers

[11] 4,381,448
[45] Apr. 26, 1983

[54] WIDE ANGLE INTENSITY PICKOFF

[75] Inventor: Aubrey Rodgers, Huntsville, Ala.

[73] Assignee: The United States of America as represented by the Secretary of the Army, Washington, D.C.

[21] Appl. No.: 297,795

[22] Filed: Aug. 31, 1981

[51] Int. Cl.³ .................................................. G02B 5/14
[52] U.S. Cl. .................................... 250/227; 350/96.1; 250/231 GY
[58] Field of Search ....................... 250/227, 231 GY; 350/96.1

[56] References Cited

U.S. PATENT DOCUMENTS 4,342,908 8/1982 Henningsen et al. ............... 250/227

Primary Examiner—David C. Nelms
Assistant Examiner—Darwin R. Hostetter
Attorney, Agent, or Firm—Nathan Edelberg; Robert P. Gibson; Freddie M. Bush

[57] ABSTRACT

A wide angle light intensity pickoff system, having a very fine signal resolution of less than a degree, provides a linear range of about ±35 degrees with a total range of ±90 degrees. The pickoff system can be used with any angular measurement system. In a gyro system all of the active circuit components, an offset optical source and a detector, are mounted on the unstabilized housing structure. Only a fiber optic bundle is required on the stabilized gimbal for coupling optical signals to the detector. There is no mechanical contact between the stabilized gimbal and the unstabilized housing structure. This prevents gimbal/housing coupling torques while providing a wide angle pickoff capability.

12 Claims, 8 Drawing Figures

WIDE ANGLE INTENSITY PICKOFF

DEDICATORY CLAUSE

The invention described herein may be manufactured, used, and licensed by or for the Government for governmental purposes without the payment to me of any royalties thereon.

BACKGROND OF THE INVENTION

Angular measurement systems are utilized to indicate changes in angular position between reference points such as a stable reference point and an unstable reference point. Typical of such a system is a moving vehicle or missile following a preselected path. Attitude deviations of the vehicle from the path may be sensed by a gyro system (stable reference point) within the vehicle. Pickoffs associated with the gyro system provide output signals indicating the attitude change and the correction needed for the vehicle to restore itself to the path. Prior art pickoffs have often involved some degree of mechanical coupling between the two systems, stabilized and unstabilized, which results in interference such as optics, gimbal wiring/slip rings and electromagnetic torques. The wide angle intensity pickoff eliminates these torques.

SUMMARY OF THE INVENTION

A pickoff system for use with angular measurement systems that has both a very fine signal resolution and accuracy over a wide angle. The fine signal resolution allows accurate detection of incremental changes. The wide angle of operation provides a minimum linear range of 70°, with a total range of 180° when the nonlinear range is included. An optical source and detector are mounted on unstabilized structure with the optical source purposefully misaligned with the detector. A fiber optic bundle is positioned on a stabilized structure and provides an optical path between the optical source and detector for providing a variable signal therethrough in response to angular position changes between the unstabilized structure and the stabilized structure.

DESCRIPTION OF THE PREFERRED EMBODIMENT

Figure 1:
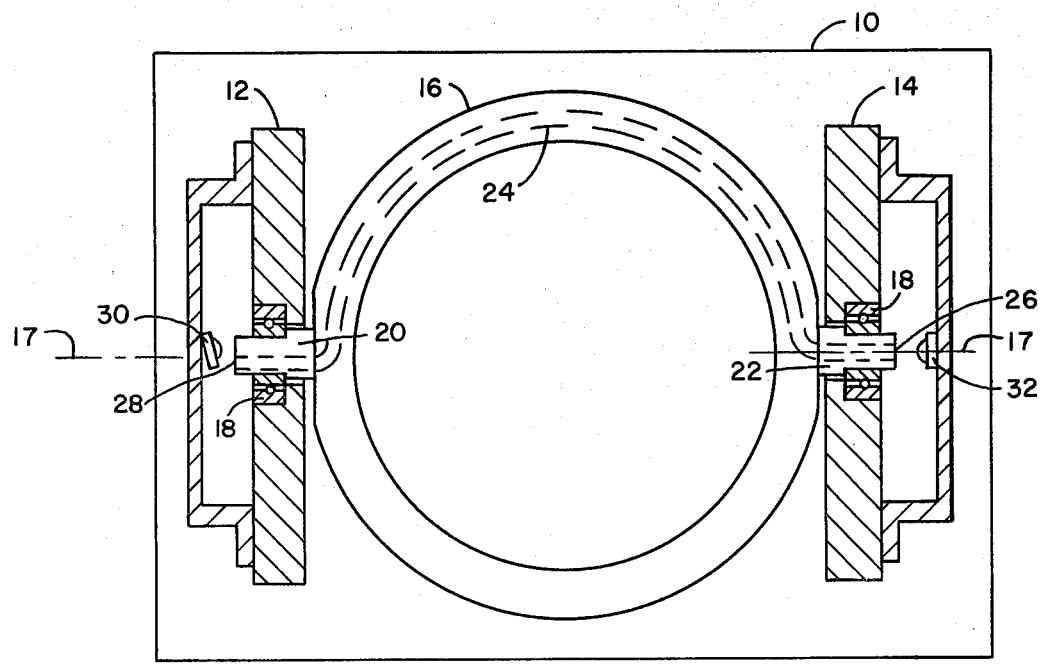
FIG. 1 is a plan view of a stabilized gimbal assembly with the wide angle intensity pickoff system.
Figure 2:
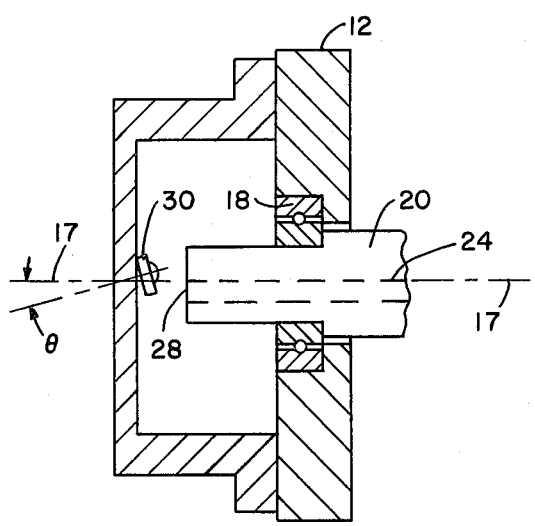
FIG. 2 is an enlarged view of a gimbal support structure of FIG. 1 for showing the relationship between the pickoff optical emitter and the gimbal bearing.

Referring now to the drawings wherein like numbers disclose like parts, FIGS. 1 and 2 disclose a simplified gimbal assembly in which a preferred embodiment of the wide angle pickoff is utilized. An unstable support structure 10 is adapted to be free to move in space and may typically be fixed within a missile housing. Support 10 is shown having support members 12 and 14 for supporting a stabalized gimbal 16. Gimbal 16 is supported by bearings 18 on respective shafts 20 and 22 such that the gimbal is decoupled from unstable support 10. As shown in dashed lines, gimbal 16 and shafts 20 and 22 have a fiber-optic bundle 24 therein which provide a light path from one end to the other. The particular location of the bundle in or on gimbal 24 is not critical. For example the bundle may follow only one structural path as shown or may be split if desired and follow two paths from one side to the other. If a second gimbal or other structure should be attached to gimbal 16, the optical bundle would obviously be routed so as to not interfere with operation of the structure. The end or face 26 of bundle 24 is passed coaxially through support shaft 22 so that it lies substantially on the bearing axis 17. The end or face 28 of bundle 24 is passed through support shaft 20 and lies off the bearing axis. The center line of the fiber optics bundle passing through shaft 20 is located remotely from the bearing axis 17 such that at face 28 the center line is parallel with and located a distance r from the center line of shaft 20 and bearing 18 axis. An optical emitter 30 is positioned on support member 12 substantially on bearing axis 17. However the optical emitter 30 is positioned so that the optical emission path is at an acute angle $\theta$ with respect to axis 17. An optical detector 32 is supported by member 14 on axis 17 and is coaxial with the axis for receiving light coupled through bundle 24.

Figure 3:
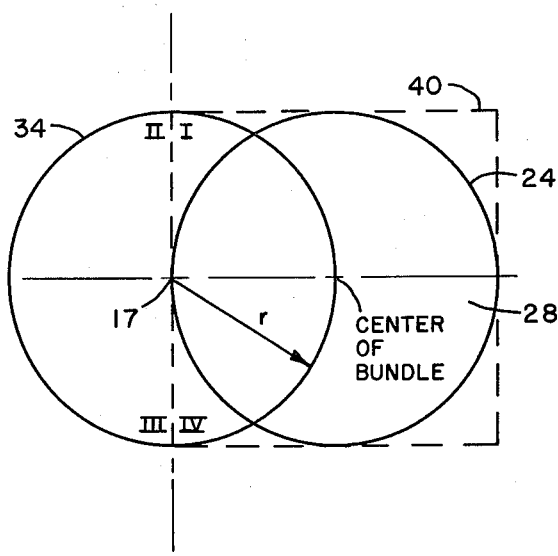
FIGS. 3, 4, and 5 are geometric diagrams showing the relationship between the pickoff emitter, the gimbal axis, and the fiber optic transmission bundle.
Figure 4:
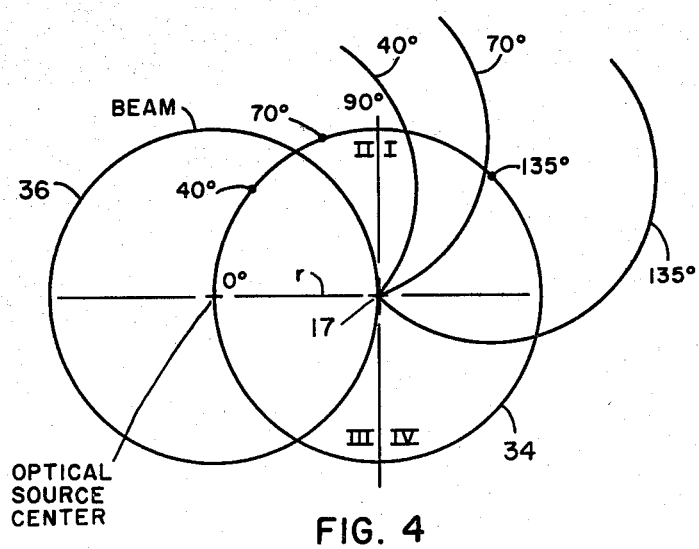
Figure 5:
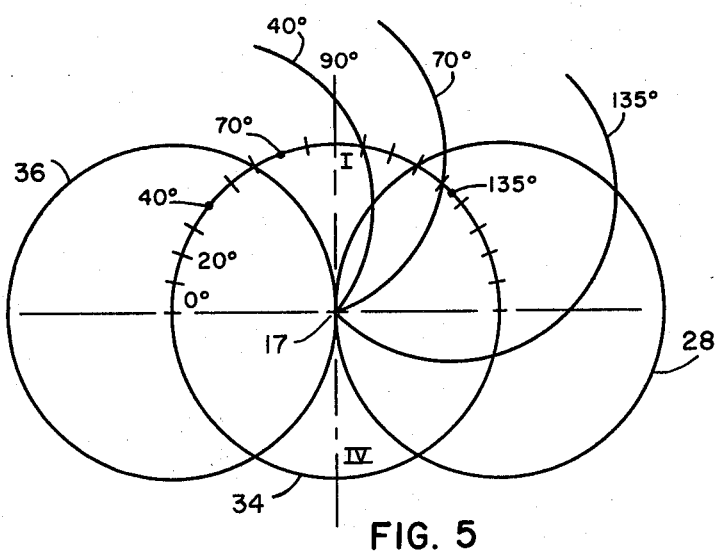

FIGS. 3, 4, and 5 are helpful in showing operation of the pickoff. FIG. 3 shows the relationship between a circular end 28 of fiber optic bundle 24 and the bearing axis 17 to be the distance r which is the radius of a circular bundle 24 such that an edge of the bundle at face 28 falls along the axis 17. Thus if a circle 34 of radius r is drawn around axis 17, the fiber optic bundle end 28 falls only in quadrants I and IV of the circle 34. As shown in FIG. 4 and with reference to FIG. 2, a light beam 36 from optical source 30 is positioned at an angle $\theta$ so that the distance from the center of the beam 36 to the edge of the beam at gimbal bearing axis 17 is approximately the distance r. For a zero or 0° reference position on the circle 34, beam 36 is positioned to fall in quadrants II and III of circle 34 and no light impinges on the face 28 of bundle 24.

FIG. 5 is a composite of FIGS. 3 and 4 with circle 34 located between beam 36 and fiber bundle end 28. Starting at the referenced 0° on circle 34 a series of arc's are shown at 10° intervals around the circumference of the circle, through 180°. As housing 10 is moved on bearings 18 around shafts 20 and 22 the center of optical beam 36 follows the path identified on circle 34, moving the beam in a circular pattern around axis 17 so that the beam gradually enters quandrant 1 and then quadrant 4, eventually completely overlapping the surface 28 of bundle 24 when 180° of rotation have occurred. Thus a minimum light passage through bundle 24 occurs at 0° and a maximum at 180° as is shown in FIG. 6.

To provide linear angular deviation sensing in both clockwise and counter clockwise directions for a given plane of rotation it is necessary that optical source 30 be positioned initially so that approximately half of the total light emitted therefrom is coupled through bundle 24 to detector 32. This provides a null or balanced condition, indicating no change. While this can be calculated roughly, mathematically there are inherent losses such as those at the open face of the fibers due to cutting and polishing which affect the accuracy. A simple, rapid and facile method is to simply operate the system with the output coupled to an oscillograph or other recording means which identifies the minimum and maximum light reception points. The half-light (null) position is approximately half way between these points as noted in FIG. 6. In FIG. 6 this measurement position occurs at approximately 90° from the observed zero reading. In FIG. 5 this half-light position occurs when approximately half of the bundle 28 circle is within the arc of light 36. This occurs at approximately 130° of rotation around the circumference of circle 34 from the 0° reference shown in FIG. 5 for the particular example. This angular position is not fixed and varies depending on the particular angle $\theta$ used as well as the distance between emitter 30 and face 28 and the efficiency of the particular fiber bundles 24 used. This approximate half-light position is the gimbal caged position.

Figure 6:
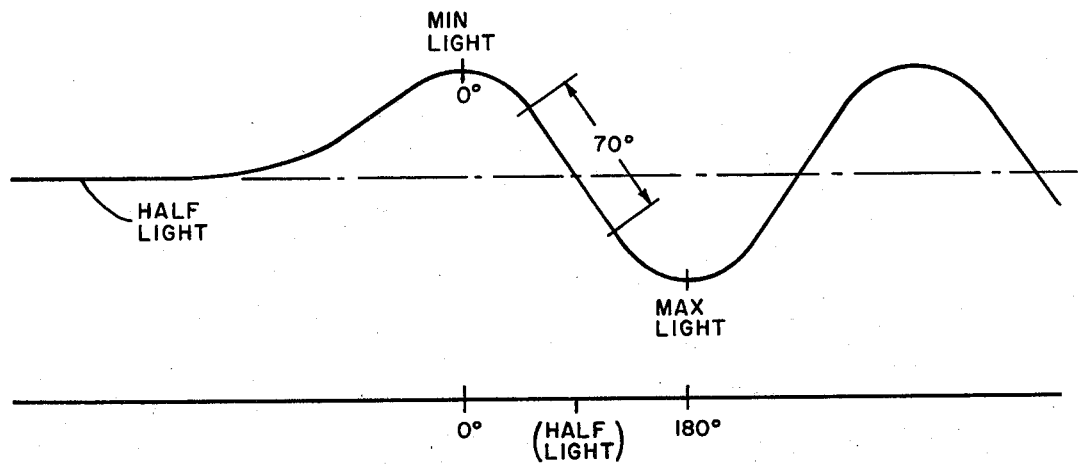
FIG. 6 is a graph of an output signal from the pickoff system as the unstable platform is moved uniformly from 0° through 180°.
Figure 7:
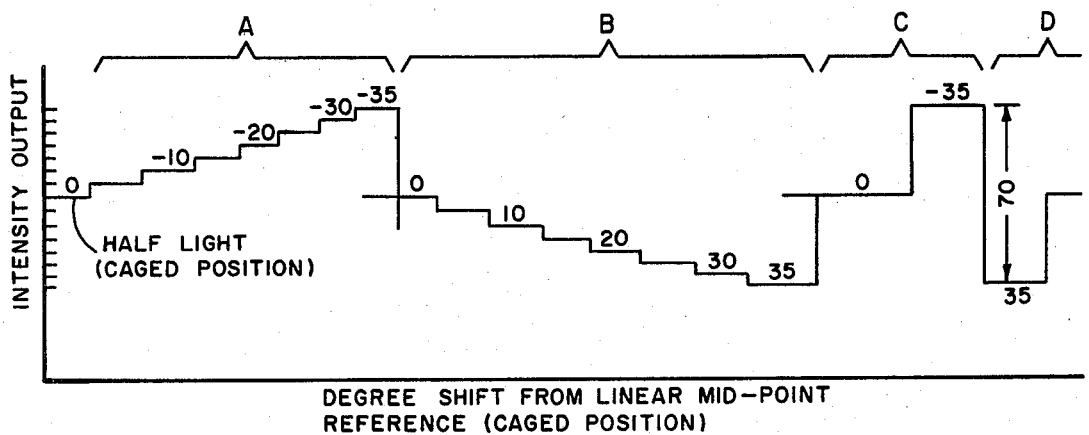
FIG. 7 is a graph of the pickoff output signal as the unstable platform is moved in stepped increments between desired linear limits.

FIG. 7 is a graph taken at intervals from the caged position (half-light) toward the minimum light and toward the maximum light positions over the 70° linear portion of the curve of FIG. 6. Curve A shows the decrease in signal intensity with 5° changes counter clockwise in angular position from the caged position aftr uncaging for 35° of movement. Returning rapidly to the half-light position curve B then shows an increase in detected signal intensity over 35° of clockwise rotation for a total range of 70°. The linearity of this response curve across this 70 degree range is plotted in FIG. 8 with the dots indicating the actual position with respect to the reference line. Curves C and D of FIG. 7 show a rapid transition, first through 35° from the half-light point to a minimum and then (curve D) rapidly through 70° to a maximum and, back to the desired half-light position. In a missile system or similar system where deviation of the missile from a particular attitude is promptly corrected a normal response would be small angular correction. However, sudden turbulance such as strong wind gusts or concussion causing large angular deviation can still be compensated for so that a missile can be readily restored on course with wide angle intensity pickoff.

The wide angle intensity pickoff requires a minimum of components and provides large scale, accurate response. A single light emitting diode or transistor such as the Motrola MFOE 100 or 200 can function as the optical source. A spectral response matched phototransistor such as the MFOD 200 can function as the detector. Any of a bundle of optical fibers provide the coupling and a low-power source drives the active components. Signal resolution down to 0.025 degrees or less can be achieved with these components, as is evidenced by the sharp, rapid transition between the output levels of FIG. 7. Output coupling from the detector to load circuitry or using circuitry is well established and therefore not discussed herein as also is the case with gimbals and stable platforms. The wide angle intensity pickoff allows accurate use of an optical system without the restrictive requirements of polarization optics, analyzers or slip rings. It is also insensitive to electromagnetic energy interference as well as being cost effective. The pickoff can be used on any gimbal system that requires angular position signals.

In operation of the pickoff, the light source 30 and photodetector 32 are energized. A light beam is directed along the axis of light source 30 at the angle theta with bearing axis 17. The gimbal null angle is in a caged position so that one-half of the maximum intensity from light source 30 enters fiber optics 24 at face 28. This caged (half-light) position may be identified by any angular designation and may be 0°, this 0° should not be confused with that mentioned earilier herein with respect to determining the caged position. When the stabilized gimbal is uncaged, housing 10 angles relative to the stabilized gimbal position are proportional to the light energy entering the optical face 28. If housing 10 is rotated counter clockwise from 0° to the 90° position, the light entering fiber optics 24 will vary from one-half to minimum intensity for corresponding angles. If housing 10 is rotated clockwise from 0° to the 90° position, the light entering fiber optics 24 will vary from one-half to maximum intensity for corresponding angles of rotation. Detector 32 measures the light intensity for all corresponding angles between maximum and minimum positions and couples an output electrical signal (not shown) to using circuitry.

Figure 8:
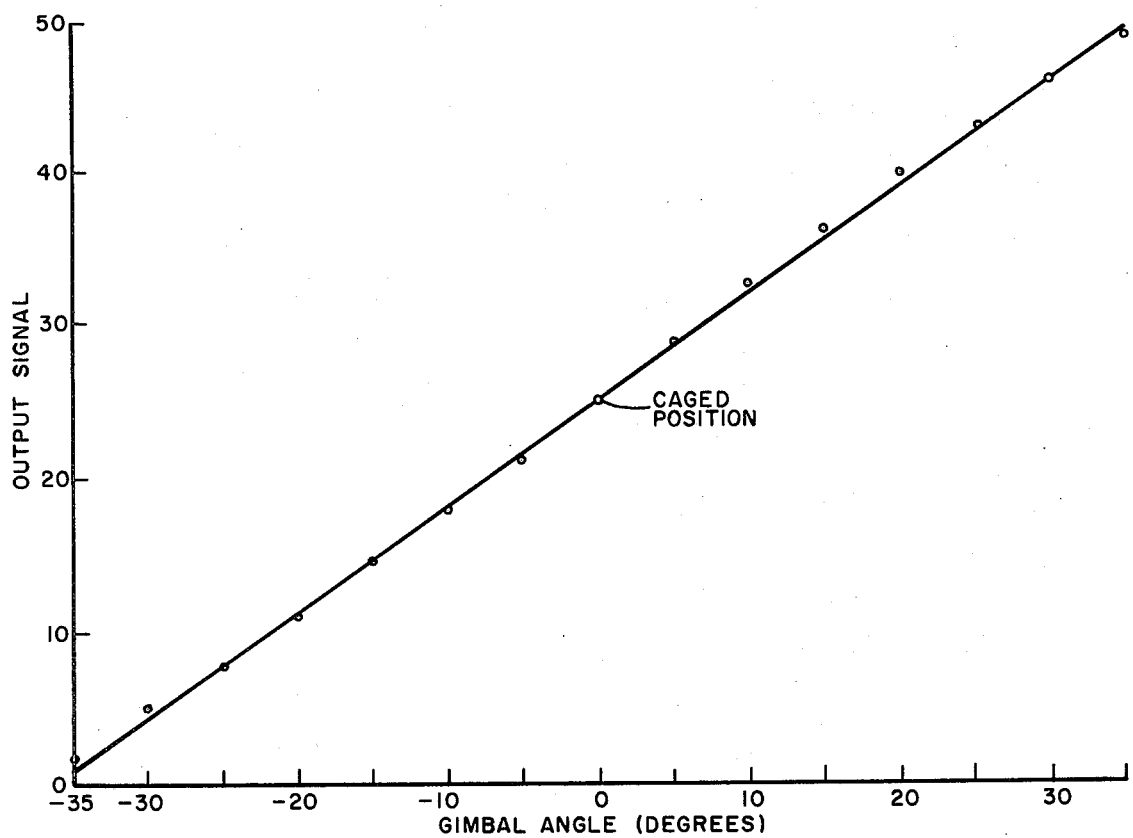
FIG. 8 is a graph showing linearity of the pickoff output signal over a wide angle of operation.

FIG. 6 illustrates the maximum-minimum intensity output signal. FIGS. 7 and 8 show the pickoff linear scale factor range from half light to ±35°. The pickoff has a total output range of ±90° if the nonlinear part of the scale is used.

While this preferred embodiment has been set forth using circular light beams and circular faced fiber optics, it is apparent that other light spot shapes and fiber optic configurations may be used to enhance linearity of the scale factor. For example, the square 40 dashed in around fiber optic bundle 24 in FIG. 3 represents a fiber optic bundle 24 having a square face 40 by shaping or masking the bundle for receiving the optical energy. Using this square face 40 in FIG. 5 results in earlier beam overlap of the face and resultant earlier signal strength detection such that the signal is much stronger at the 20°, 30°, and 40° mark than with a circular fiber bundle face. The signal pickup is also increased beyond 120°. This stronger signal results in an increased linear range of the output signal. Accordingly, it will be obvious to those skilled in the art that modification may be made without departing from the scope and spirit of the invention. Therefore, it is understood that the invention is limited only by the claims appended hereto.

I claim:

1. A wide angle light intensity pickoff comprising: a light source, a light detector, and a light coupling means disposed between said light source and said light detector, said light source being adapted for movement with respect to said coupling means, said coupling means having a light receiving face adjacent to said light source and having a second or output face adjacent to and coaxial with said light detector, said light source being positioned for directing a light beam at an acute angle toward said receiving face for providing a variable light intensity on said face in response to movement of said light source with respect to said receiving face.

2. A wide angle light intensity pickoff as set forth in claim 1 wherein said light beam is directed at a variable acute angle toward said receiving face for providing a variable light intensity on said face in response to movement between said light source and said receiving face, and said light detector is fixed in position with respect to said light source.

3. A wide angle light intensity pickoff as set forth in claim 2 wherein said movement is angular.

4. A wide angle light intensity pickoff as set forth in claim 3 wherein said angular movement is rotational.

5. A wide angle light intensity pickoff as set forth in claim 3 wherein said angular movement is variable oscillation between two extremes of an arc around a center axis and having a maximum arc of 180°, said receiving face being a fixed radius offset from the center axis.

6. A wide angle light intensity pickoff as set forth in claim 5 wherein said light source is physically disposed coaxial with said arc center axis and is positioned for directing a beam of light at an acute angle with respect to said center axis.

7. A wide angle light intensity pickoff as set forth in claim 6 wherein said light source is located for directing said beam of light at said acute angle so that it does not impinge on said receiving face when the arc is at 0° of oscillation and fully impinges on said receiving face when said arc is at 180° of oscillation for providing a variable intensity output to said detector indicative of the degree of movement of said light source.

8. A wide angle light intensity pickoff as set forth in claim 7 wherein said coupling means is a fiber optic bundle and said receiving face has a circular surface.

9. A wide angle light intensity pickoff as set forth in claim 7 wherein said light source is prepositioned so that substantially half of the maximum available light or half-light from said source impinges on said receiving face prior to any movement between said light source and said receiving face for providing a linear output from said light detector in response to oscillation through a portion of said arc for at least ±35°.

10. A wide angle light intensity pickoff as set forth in claim 9 wherein said receiving face has a square surface for enhancing the area of receiving light incidence on said coupling means for extreme angular positions of said light source beyond ±35° of said arc from said half-light position, and thereby increasing the linear range of operation.

11. A wide angle light intensity pickoff as set forth in claim 10 and further comprising first and second housings, said second housing being moveably disposed with respect to said first housing; said coupling means being disposed on said first housing and said light source and light detector being disposed on said second housing.

12. A wide angle light intensity pickoff as set forth in claim 11 wherein said coupling means is a fiber optic bundle and said light source is a light emitting semiconductor device, said first housing is a stable platform moveably supported on said second housing and disposed for said angular movement therebetween.

* * * * *